United States Patent
Sivan et al.

(10) Patent No.: US 6,281,874 B1
(45) Date of Patent: Aug. 28, 2001

(54) METHOD AND SYSTEM FOR DOWNLOADING GRAPHIC IMAGES ON THE INTERNET

(75) Inventors: Zohar Sivan; Hagia Krupnik, both of Haifa; Benjamin Cohen, Misgav, all of (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/141,320

(22) Filed: Aug. 27, 1998

(51) Int. Cl.⁷ .................................................. G09G 5/00
(52) U.S. Cl. .................................. 345/127; 345/2
(58) Field of Search ................... 345/428, 132, 345/130, 127, 114, 302, 2; 709/218

(56) References Cited

U.S. PATENT DOCUMENTS

| | | | |
|---|---|---|---|
| 5,404,316 | * 4/1995 | Klingler et al. | 345/302 |
| 5,682,529 | * 10/1997 | Hendry et al. | 345/342 |
| 5,838,906 | * 11/1998 | Doyle et al. | 709/202 |
| 5,864,711 | * 1/1999 | Mairs et al. | 345/522 |
| 5,874,960 | * 2/1999 | Mairs et al. | 345/340 |
| 5,880,856 | * 3/1999 | Ferriere | 358/426 |
| 5,986,670 | * 11/1999 | Dries et al. | 345/435 |
| 6,040,818 | * 3/2000 | Minami et al. | 345/147 |

OTHER PUBLICATIONS

The open image retrieval system "Girls" on the World Wide Web; Hiroki Takaha e al.; Technical Report of IEICE; Issue No. IE95-76; Nov. 1995; pp. 1–8.*

* cited by examiner

*Primary Examiner*—Jeffery Brier
*Assistant Examiner*—Ryan Yang
(74) *Attorney, Agent, or Firm*—Browdy and Neimark

(57) ABSTRACT

In a method and system for downloading graphic images on the Network, at least one high-resolution graphic image file of a reference image is stored at a network server. At least part of the reference image is compressed and downloaded at reduced resolution from the network server to a client connected to the network server. Upon suitable decompression, a corresponding low-resolution image is displayed and size data uniquely specifying a portion of the displayed image is uploaded from the client to the network server. The specified portion of the high-resolution graphic image file is extracted from the network server and downloaded to the client where it is displayed. Such an approach obviates the need to transfer high-resolution data intensive graphic files to the client and further allows the heavy image processing to be performed on the server much faster than is achieved in prior approaches where processing is performed locally at the client.

40 Claims, 3 Drawing Sheets

METHOD AND SYSTEM FOR DOWNLOADING GRAPHIC IMAGES ON THE INTERNET

FIELD OF THE INVENTION

This invention relates to downloading graphic images through the Internet.

BACKGROUND OF THE INVENTION

With the emerging use of Internet "Web-Browsing", encapsulation of images within Web pages has become very common. However, in many situations such as art museums' home pages, navigation simulations, aerial imaging and medical archives, the standard technologies do not provide proper and efficient solutions. This is because high-resolution, high quality digital images are required which demand heavy traffic over the network and high processing power in the client machine.

Moreover, it is rarely possible to view the complete image at high resolution owing to the limited size of computer display monitors. Consider, by way of example, a museum home page allowing a visitor on the Web to view artwork on display at the museum. The artwork is stored on the Web server as a series of graphic files each derived by scanning the respective artwork at very high resolution. The resulting graphics files typically contain several millions of pixels whilst the highest quality display monitors currently available rarely have a resolution greater than 1000×1000 pixels. Thus, in order to download the whole image from the server, some of the high resolution inherent in the original graphic image must be sacrificed.

Frequently, however, it is not necessary to view the whole image at high resolution. Typically, a visitor to the Web site is content to view the complete image at relatively low-resolution providing that it is possible to select sections thereof for viewing at the highest resolution inherent in the original image stored on the Web server. This requirement has been addressed in the art, but with only limited success. Thus, a Web Site is known having the access name "www-.ZoomMagic.com" in which images are stored on a Web server using the Photo CD file format which is proprietary to the Kodak Company. When a user accesses the Web site, various vignettes are displayed as miniature low-resolution images. Clicking on one of the images with the mouse, results in the selected image being displayed at full size at higher resolution in an area of the display presented as a TV screen having control buttons for allowing zooming and shifting as well as image cropping.

Zooming is achieved by clicking on the zoom button, whereupon the image is magnified by a predetermined factor, typically x2. In order to magnify the image more than this, the zoom button must be clicked again so as to allow the image to be successively magnified by the same magnification ratio, up to a predetermined maximum permitted zoom ratio. If, having thus magnified the image, the user is interested in a section of the image that is off-screen, then the image can be shifted by clicking on appropriate control buttons. The displayed image can also be cropped so as to remove sections thereof that are of no interest and may be distracting. Cropping is achieved by defining a window in the displayed image, whereupon the peripheral image surrounding the window is replaced by non-image data bearing no resemblance to the original image.

Such an approach suffers from several drawbacks. The Photo CD file format of the graphic images stored on the server is not provided in commonly available Web Browsers and therefore the necessary decompression algorithms must also be downloaded to the client. This adds to the overhead and increases the response time.

Furthermore, the manner in which zooming is performed is inflexible and cumbersome. Specifically, only predetermined zoom ratios are possible and integer multiples thereof can be obtained only by repeated zooming in discrete stages. Fine-tuning of the displayed image so as to display off-image sections thereof requires shifting the image after it has been magnified and this further adds to the processing overhead.

These drawbacks result in sluggish performance whereby the initial connection time is slow owing to the need to download proprietary decompression algorithms. Moreover, zooming in on a required section of the image is generally not amenable to a single operation thus requiring repeated graphic processing with the consequent time overhead. Furthermore, whilst image processing is being performed by the client software, the original size image remains intact, there being no pictorial feedback to the user that anything is happening even in the background. It may thus appear to the user that the system has crashed or that the software is defective, possibly resulting in his aborting the program. Bearing in mind that, the client-server communication to provide high-resolution image data imposes a significant time overhead, the lack of feedback is a serious source of frustration.

Many of the above limitations are characteristic of prior art approaches which rely on local processing by the client of image data downloaded from the Web server. Typically, standard compressed image formats such as JPEG are used, thus obviating the need to download proprietary decompression algorithms since the necessary decompression algorithm is already provided in the client's Web browser software. However, since the whole of the graphic image still requires downloading and local processing by the client is mandatory in order to effect the required zooming, prior art approaches are inherently sluggish in performance.

SUMMARY OF THE INVENTION

It is an object of the invention to provide a method and system for downloading graphic images on the Internet in which the drawbacks associated with hitherto-proposed methods are significantly reduced or eliminated.

According to a first aspect of the invention there is provided a method for downloading graphic images from a network server which stores at least one high-resolution graphic image file of a reference image and a corresponding low-resolution graphic image file, the method comprising the steps of:

(a) downloading at least part of said low-resolution graphic image file from the network server to a client connected to the network server for displaying a corresponding low-resolution image on a display device at the client, (b) uploading from the client to the network server size data uniquely specifying a portion of the image displayed in (a), (c) extracting said portion of the high-resolution graphic image file from the network server and downloading to the client, and (d) conforming said portion of the high-resolution graphic image to a display area of the display device for display in said display area thereof.

Typically, the network is the Internet and the high-resolution graphic image file is compressed using a conventional compression format such as JPEG commonly provided in standard Web Browsers. This obviates the need to download decompression software from the Web server to the client.

Preferably, a portion of the displayed low-resolution image can be selected with a pointing device, such as a computer mouse, so as to define a zoom ratio. This is preferable to magnifying the image by a predetermined zoom ratio since it allows any desired fraction of the displayed image to be zoomed in a single action. In order to avoid the feeling that the system has "hung", the selected portion of the low-resolution image at the client may be immediately displayed whilst the server extracts the corresponding high-resolution image which may take several seconds. Then when the selected portion of the high-resolution image has been extracted, it is downloaded to the client and replaces the low-resolution image already displayed.

According to a further aspect of the invention, there is provided a system for downloading graphic images on a network, the system comprising:

a network server having a network memory for storing at least one high-resolution graphic image file of a reference image and a low-resolution graphic image file corresponding thereto, a communication line for downloading said low-resolution graphic image file from the network server to a client connected to the network server via the communication line, a memory at the client for storing the low-resolution graphic image file, a display device coupled to the memory for displaying a low-resolution image at the client corresponding to the low-resolution graphic image file, a zoom control coupled to the memory for uniquely specifying a portion of the low-resolution image which is to be displayed at high-resolution, a client processor coupled to the memory and responsively coupled to the zoom control for determining size data uniquely defining said portion and for uploading said size data via the communication line to the network server, a network processor responsive to the size data for extracting said portion of the high-resolution graphic image file from the network server and downloading via the communication line to the client for display in said display area of said display device, and an image processor for conforming the portion of the high-resolution graphic image to a display area of the display device.

The selected portion is typically selected arbitrarily by the user using a pointing device such as a mouse, there being no constraints on the size of the selected area, other than physical boundaries of the display device. It may thus occur that the selected area contains more pixels in the high-resolution image than can be accommodated within the display area. In order to allow for this eventuality, the high-resolution image is conformed to the display area by reducing the size of the selected portion such that the number of high-resolution pixels can be accommodated in the display area. Preferably, this is done prior to downloading the high-resolution image data in order to avoid downloading redundant data. However, it is also possible to process the image at the client prior to displaying.

BRIEF DESCRIPTION OF THE DRAWINGS

In order to understand the invention and to see how it may be carried out in practice, a preferred embodiment relating to use on the Internet will now be described, by way of non-limiting example only, and with reference to the accompanying drawings, in which.

DETAILED DESCRIPTION OF PREFERRED EMBODIMENTS

Figure 1:
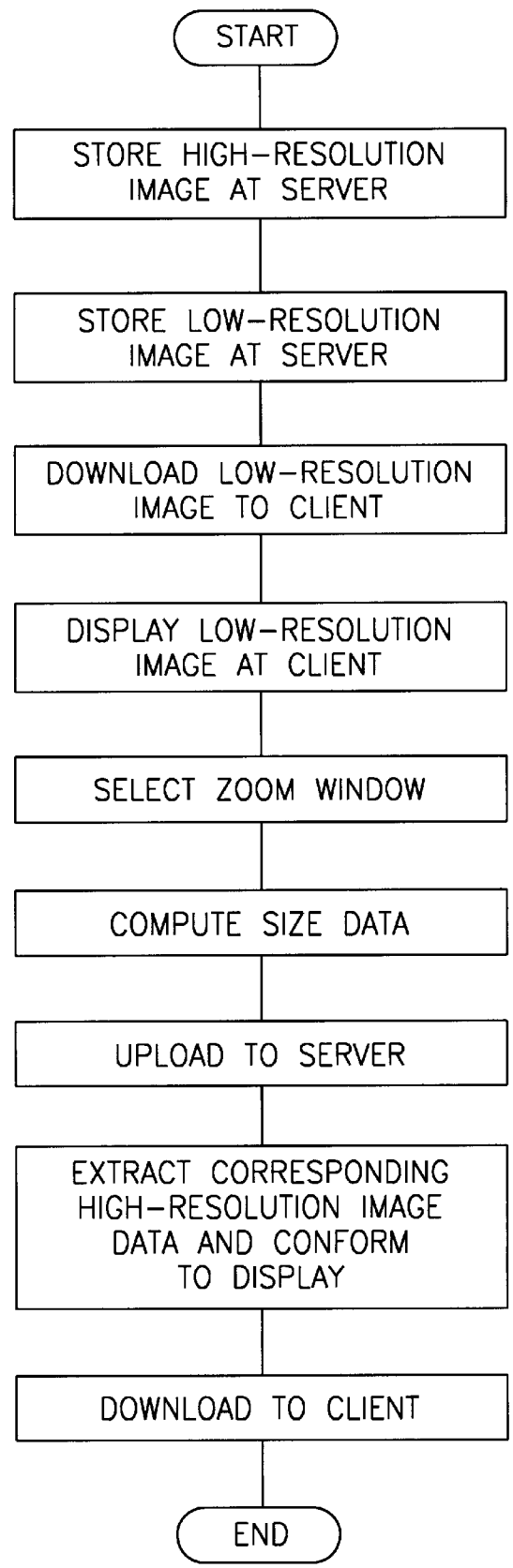
FIG. 1 is a flow diagram showing the principal operating steps in a method according to the invention.
Figure 2:
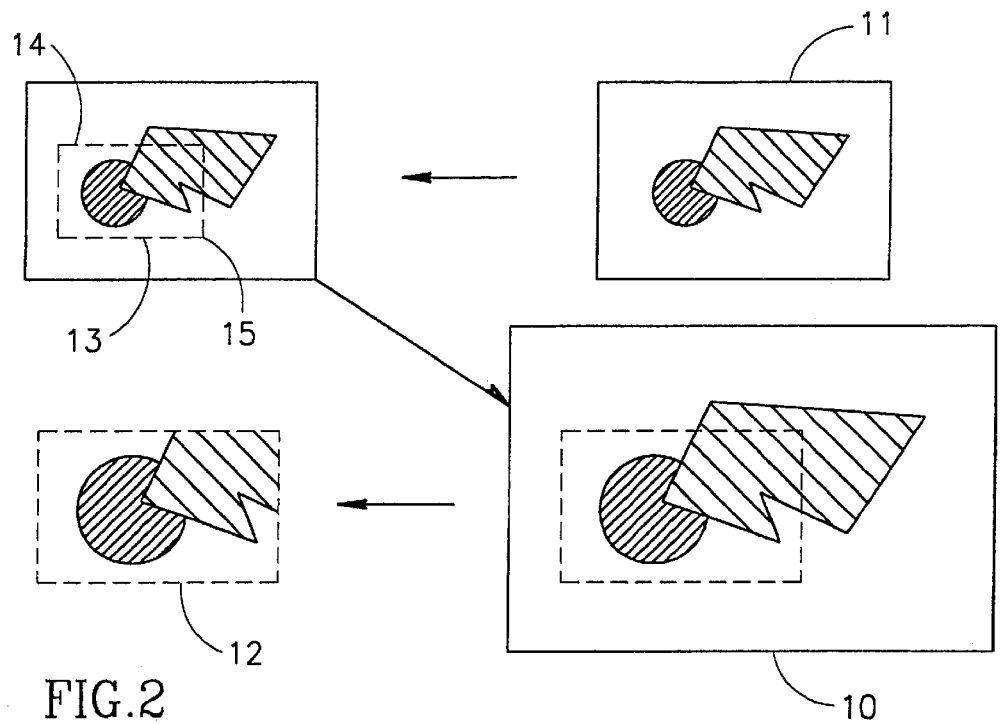
FIG. 2 shows pictorially high and low resolution graphic files respectively associated with a Web server and client according to the invention.

FIG. 1 is a flow diagram showing the principal operating steps associated with the method according to the invention and FIG. 2 shows pictorially details of graphic files associated therewith. A high-resolution graphic file 10 contains 2000×1600 pixels for storing a high-resolution reference image on a Web server. Also stored on the Web server is a corresponding low-resolution graphic file 11 of a low-resolution reference image being sixteen times smaller than the high-resolution graphic file 10. That is to say, it contains only 500×400 pixels in total for displaying on a display device 12 at the client. The low-resolution graphic file 11 may be produced by low-pass filtering and sub-sampling the high-resolution file. The manner in which this is done is not itself a feature of the invention and such techniques are, in any case, well known in the art.

The low-resolution graphic file 11 is compressed in accordance with JPEG format and downloaded through the Internet to a client. The client decompresses and displays on the display device the corresponding low-resolution reference image. Other formats than JPEG may be employed, but it is advisable to use a format commonly provided in Web Browsers since this obviates the need to download decompression software to the client and therefore speeds processing time. A portion 13 (shown in dotted outline) of the low-resolution reference image shown at the client is selected for zooming. For the sake of preliminary explanation, it is assumed that the selected portion 13 contains 12,500 pixels corresponding to 500×400 pixels in the high-resolution reference image. Thus, all 200,000 pixels of the client's display device must be replaced by 200,000 pixels of the high-resolution image corresponding to the selected portion 13. In practice, of course, this need not be the case as is explained in detail below. Upon selecting the portion 13, the client calculates size data uniquely specifying the portion 13. For example, the size data may include the upper left and lower right coordinates 14 and 15, respectively, of the portion 13. Alternatively, the upper left coordinate 14 in conjunction with the width and height of the selected portion 13 also allows the selected portion 13 to be uniquely determined and could just as effectively be used. It will be understood that the term "size data" denotes not merely the dimensions of the selected portion but also its location. The calculated size data is uploaded to the server. In the context of the invention and the appended claims, the term "downloaded" is used to imply data flow from the server to the client, whilst term "uploaded" is used to imply data flow from the client to the server.

Having uploaded the size data from the client to the server, the selected portion of the high-resolution graphic image file is extracted from the Web server and downloaded to the client. Thus, in the above example, the 200,000 pixels in the high-resolution image file corresponding to the 12,500 pixels in the selected portion are downloaded to the client where they are displayed on the display device. Since the display device is assumed to possess only 200,000 pixels, in this case the zoomed image completely fills the display device.

In the above example, the size of the selected portion is assumed to bear a fixed predetermined relationship with that of the reference image: equal to the maximum zoom ratio. In such case, it is only necessary to select a specific origin of the low-resolution image so as to allow computation of a window therein having exactly 12,500 pixels and bearing a predetermined spatial relationship with the origin. For example, the origin might specify the mid-point of the selected window; but it could just as easily define the lower left corner, and so on. In the case that the selected portion is defined as a window having exactly 12,500 pixels, the "size data" represents only the selected origin or a predetermined spatial relationship thereof to a known pixel in the displayed low-resolution image.

In practice, it is far more flexible for the user to be able to select a window of any size, and thus containing an arbitrary number of pixels. This may be achieved using the mouse (constituting a pointing device) for defining a rectangular window corresponding to the selected portion 13. In this more general case, the size data must uniquely specify not only the location of the selected portion but also its size. Two complications can now arise, each on its own or the two in combination.

First, the selected portion will not necessarily have the same aspect ratio as the display device. In this case, a zoom ratio is calculated so that one edge of the selected portion completely fills the corresponding edge of the display device.

Figures 3A, 3B:
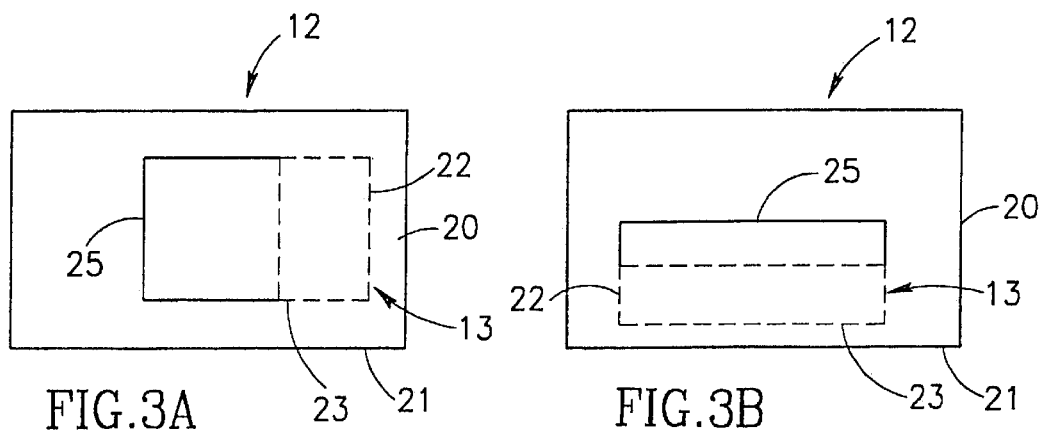
FIGS. 3a to 3d show schematically a display device wherein a portion of a displayed image selected for zooming has a different aspect ratio to that of the display device.

FIG. 3a shows the display device 12 having a vertical edge 20 and a horizontal edge 21. The selected portion 13 has a vertical edge 22 and a horizontal edge 23 in "portrait" orientation wherein the size ratio of the vertical edge 22 to the vertical edge 20 of the display device 12 is smaller than the size ratio of the horizontal edge 23 to the horizontal edge 21 of the display device 12. In this case, the maximum zoom ratio is equal to the size ratio of the vertical edge 22 to the vertical edge 20 of the display device 12.

FIG. 3b shows the reverse situation wherein the selected portion 13 has a "landscape" orientation. In this case, the size ratio of the vertical edge 22 to the vertical edge 20 of the display device 12 is larger than the size ratio of the horizontal edge 23 to the horizontal edge 21 of the display device 12. Consequently, the maximum zoom ratio is equal to the size ratio of the horizontal edge 23 to the horizontal edge 21 of the display device 12.

It is clear that if all of the selected area is to be shown in the display device, the maximum permissible zoom ratio is equal to the smaller of the size ratios of the respective edges of the selected portion to those of the display device 12. It is also apparent that in either case, once the selected portion is zoomed by the maximum permissible zoom ratio, the enlarged image does not fill the display device.

Figures 3C, 3D:
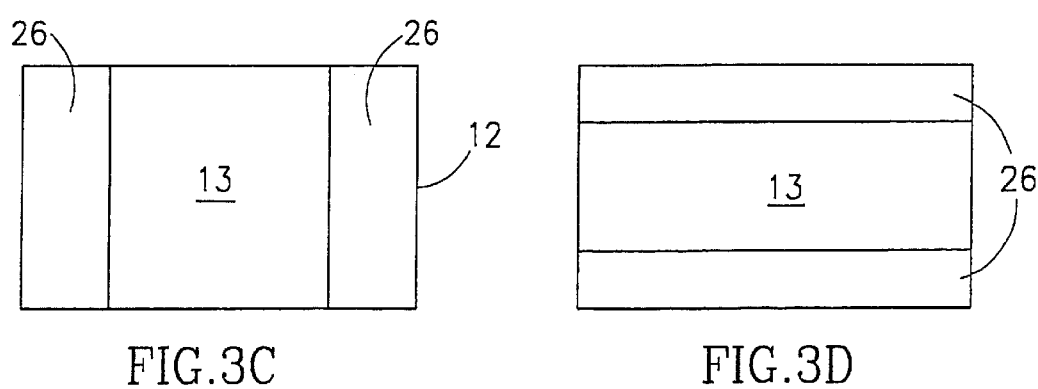

An area 25 of the high-resolution image containing the selected portion 13 is identified such that the area 25 has an aspect ratio equal to that of the display device 12. The area 25 is zoomed by the maximum permissible zoom ratio. In FIG. 3c, the vertical edge 22 of the zoomed image expands to the vertical edge 12 of the display device 12, whilst in FIG. 3d, the horizontal edge 23 of the zoomed image expands to the horizontal edge 21 of the display device 12. In both cases, the displayed image contains a marginal sub-portion 26 of the reference image that is outside the selected portion 13. In order to indicate that the sub-portion 26 was not actually selected, it is displayed with a different display characteristic to that of the selected portion 13. For example, the sub-portion 26 may be displayed at a reduced brightness to that of the selected portion 13.

The second complication arises when the selected portion is so small that even after zooming to the highest available resolution it does not fill the display device. In this case, the selected portion 13 is zoomed so as to leave a peripheral sub-portion 26 of the reference image surrounding the zoomed selected portion. Here also, the sub-portion 26 is displayed at a reduced brightness to that of the selected portion 13, so as to indicate that the sub-portion 26 was not actually selected. Likewise, any other suitable display characteristic may be used to distinguish between the selected portion 13 and the unselected sub-portion 26.

It is apparent from the foregoing that the heavy image processing relating to extraction of the selected portion from the high-resolution image file is performed by the server. The processing time may thus be minimized by using a powerful computer for the Web server, which anyway is normally the case. This is preferable to requiring the use of a powerful computer for the client where the contrary is the case and the processing time would thus be unwieldy. Although processing the image data on the server is fast, there is still an inevitable hiatus between selecting a portion of the displayed low-resolution image and the equivalent high-resolution image being downloaded from the server. The waiting time results mainly from limitations in the bandwidth of the communication line between the Web server and the client.

During this waiting time, providing feedback gives some assurance that something is happening. This may be done by extracting the selected portion from the low-resolution graphic image file at the client, zooming and displaying as a pseudo-zoomed image at low-resolution. In this case, zooming the selected portion, or an area containing the selected portion, to fit the display device is the reverse of creating the low-resolution image from the high-resolution image. Thus, the low-resolution graphic image file is unsampled and filtered. Then, when the selected portion of the high-resolution graphic image file is downloaded to the client by the Web server, it overlays the low-resolution image already being displayed. As explained below, with reference to FIG. 4 of the drawings, a reset control is provided in order that the user may abort this process if required.

Figure 4:
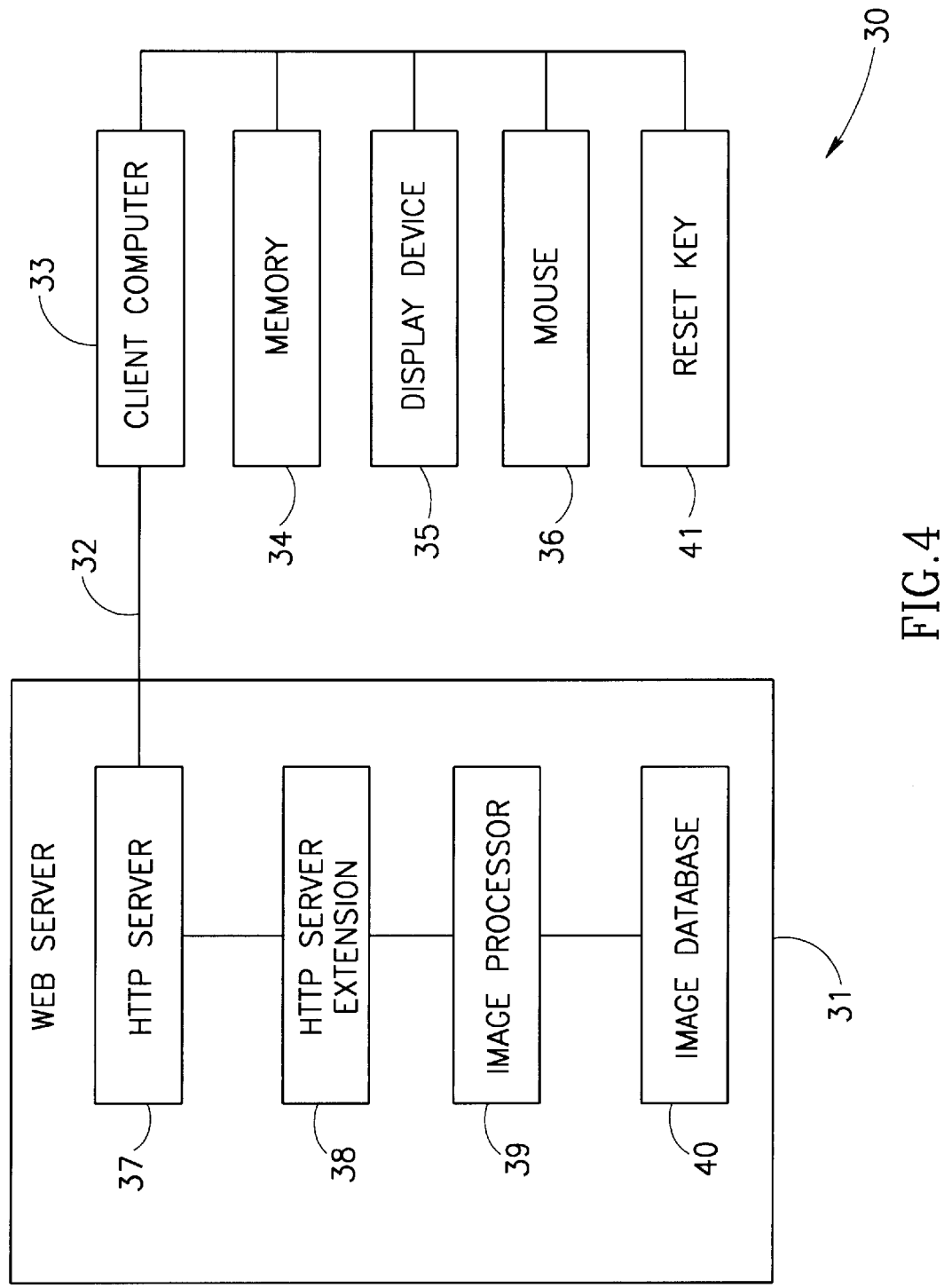
FIG. 4 is a block diagram showing functionally a system according to the invention.

FIG. 4 is a block diagram showing functionally a system designated generally as 30 for downloading graphic images on the Internet. The system 30 comprises a Web server 31 for storing at least one high-resolution graphic image file of a reference image and a low-resolution graphic image file corresponding thereto. A communication line 32 connects the Web server 31 to a client computer 33 for downloading thereto the low-resolution graphic image file from the Web server. A memory 34 is provided in the client computer 33 (constituting a client processor) for storing the low-resolution graphic image file. A display device 35 is coupled to the client computer 33 (and hence to the memory 34) for displaying a low-resolution image at the client corresponding to the low-resolution graphic image file. Associated with the client computer 33 is a mouse 36 or other pointing device (constituting a zoom control) which is coupled to the memory 34. The mouse 36 allows a portion of the displayed low-resolution image to be selected for display at high-resolution.

The client computer 33 is responsive to the mouse 36 for determining size data uniquely defining the selected portion and for uploading the size data via the communication line 32 to the Web server 31. The Web server 31 is a powerful computer (constituting a network processor) which is responsive to the size data for extracting the selected portion of the high-resolution graphic image file and conforming to the size of the display area. This is then downloaded via the communication line 32 to the client computer 33 for display on the display device 35.

The graphic image file contains pixels associated with which are various display characteristics, such as brightness, contrast, color or gray-scale and so on. The client computer 33 is programmed to change at least one of the display characteristics so as to distinguish between the selected portion of the displayed image and any surrounding sub-portion which was not selected.

The Web server 31 comprises three main modules: a general-purpose HTTP server 37, an HTTP server extension 38 and an image processor 39. An image database 40 is coupled to the image processor 39 for storing high-resolution graphic files relating to the high-resolution reference images. The image processor 39 also conforms the high-resolution image to the display area by reducing the size of the selected portion such that the number of high-resolution pixels can be accommodated in the display area. The basic concept of the client-server connection is HTTP protocol communication. This gives clients located behind Firewalls access to the Web server 31 whilst protecting the Web server 31 against unauthorized intrusion. The HTTP server 37 should support servlets or related technologies for allowing queries transmitted to the Web server 31 by the client computer 33 to be parsed. Such queries contain the URL address of a servlet contained on the Web server 31 and a query string of parameters, thus allowing the server 31 to access the addressed servlet and carry out instructions and so on. The servlet exploits the HTTP protocol, which allows execution of the query strings thus received.

The HTTP server extension 38 is a servlet, for example, which handles communication with the HTTP server 37, the image processor 39 and the image database 40. The servlet is written in Java and can be described as an extension to the HTTP server 37, which runs constantly in the background and monitors requests from clients. When a client request is received by the HTTP server 37, it is passed to the servlet. The servlet extracts the high-resolution image from the image database 40 and calls the image processor 39 for image manipulation. Eventually, the servlet opens a connection to the client and returns the processed image or saves it to a file and sends the user its URL address.

The image processor 39 constitutes a network processor for running a processing module for handling the creation of the zoomed image based on parameters from the client and the high-resolution image from the image database 40. Input and output images to or from the image processor 39 are compressed according to the JPEG standard described in "The JPEG still image compression standard" by Gregory K. Wallace, Communication of the ACM, April 1991. It will however be appreciated that other compression standards can be employed, these being known per se and not being a feature of the invention. In saying this, it is reiterated that it is preferable to use a compression standard supported by the Web browser, since this obviates the need to download decompression software from the Web server to the client and saves time.

The high-resolution image is fetched from the image database 40 and decompressed by the image processor 35. It should be noted that since the portion of the image selected by the user for zooming is of arbitrary size, the high-resolution image should be at least partially decompressed. However, processing time can be saved by decompressing only the selected portion rather than the whole image. Once the image data is decompressed, it is processed to fit the image size requested by the user utilizing efficient filtering and sub-sampling. The resulting image data is compressed and downloaded to the client for display.

The speed of downloading data can be further enhanced by performing the same pseudo-zooming of the image at the server as was previously performed by the client as explained above. The server extracts the corresponding high-resolution image data, compares with the pseudo-zoomed low-resolution image data received from the client and sends to the client only a compressed difference image. The high-resolution zoomed image is now re-constructed at the client. This allows a smaller volume of data to be downloaded to the client than would be necessary if all of the selected portion of the high-resolution image were downloaded.

In order to abort the pseudo-zooming process as well as the image extraction from the server, the client computer 33 includes a reset key 41 for allowing a user reset. Upon operation of the reset key 41, a reset control is conveyed to the Web server 31 via the communication line 32. The image processor 39 is responsive to the reset control for aborting extraction of the selected portion of the high-resolution graphic image file from the image database 40 and downloading to the client. Likewise, the client computer 33 is responsive to the reset control for aborting pseudo-zooming of the selected portion of the low-resolution image. As well as this, the client computer 33 operates to re-display on the display device 35 the low-resolution image as it appeared before a portion of the displayed was selected.

The image-processing module may be written in native code in order to reduce the processing power required thereby. The image-processing module is linked to the Java servlet through the Java Native Interface (JNI) which is defined by the Java language. Alternatively, the image-processing module may be written in Java so as to allow maximum portability across servers, at the expense of lower performance.

The client is a Java applet or application, such that it can run on all major operating systems and is compatible with most computers and terminals. Configuring the system in such way obviates the need to load the client program up front. Instead, it can be loaded together with the in-line image. This also means that newer versions with new features, bug fixes and improved performance need be updated only at the server side and will automatically be updated to the client on connection to the server. The client code is reduced as much as possible in order to reduce the loading time of the client's Java classes from the network. The applet enables the display of the images within the context of the web page and the communication to the server using HTTP protocol. Thus, the display area may be less than a total area of the display device so that the displayed image is surrounded by a remaining area to which other graphical or textual information may be downloaded. This allows the invention to be used, for example, within a home page on the Web wherein only a fraction of the display is reserved for displaying a downloaded graphic image. The remaining portion of the display can be used to display data from a text file, hyperlinks and fixed graphics independent of the high-resolution image in the display area. The client handles the selection of the image portion to be zoomed, including calculating the size data and performing integrity checks to ensure that the maximum permitted zoom ratio is not exceeded. Generating the pseudo-zoomed image is also handled by the client using its web browser's internal Java support.

It should be noted that, owing to the limited resolution of currently available display devices, a typical display image is rarely larger than 1000×1000 pixels. However, the resolution of the high-resolution images may be much larger. Thus, a noticeable saving in bandwidth is achieved if no more than the selected portion of the image is downloaded at the correct resolution to the client.

Some obvious variations have already been discussed. However, it will be apparent to those of average skill in the art that other modifications can be effected without departing from the spirit of the invention. For example, in the preferred embodiments the zoom ratio is determined by selecting a rectangular window. This is then enlarged, as required, in one dimension until the aspect ratio of the enlarged window equals that of the display. The ratio between the number of pixels in the display and that in the window now determines the zoom ratio. However, it is also possible to enlarge a non-rectangular portion of the displayed image. For example, the selected portion can be circular or elliptical centered about a selected origin or pair of foci, as appropriate. The circular or elliptical portion thus selected can be zoomed either by a fixed ratio (to the extent that resolution permits) or by a zoom ratio which is calculated to allow the enlarged portion just to fit in the display monitor.

Likewise, the invention has been described with particular regard to use on the Internet by way of example. It will be understood that the invention will also find use on Local Area Networks known generically as Intranets.

It should also be noted that the use of servlets, whilst preferred, can be substituted by CGI-Bin scripts which are less efficient.

These and other obvious modifications are within the scope of the invention as defined by the claims.

In the method claims that follow, alphabetic characters used to designate claim steps are provided for convenience only and do not imply any particular order of performing the steps.

What is claimed is:

1. A method for downloading graphic images from a network server which stores at least one high-resolution graphic image file of a reference image and a corresponding low-resolution graphic image file, the method comprising the steps of:
   (a) downloading at least part of said low-resolution graphic image file from the network server to a client connected to the network server for displaying a corresponding low-resolution image on a display device at the client,
   (b) uploading from the client to the network server size data uniquely specifying a portion of the image displayed in (a), which portion is less than the total image displayed in (a),
   (c) extracting said portion of the high-resolution graphic image file from the network server and downloading to the client, and
   (d) conforming said portion of the high-resolution graphic image to a display area of the display device for display in said display area thereof.

2. The method according to claim 1, wherein step (d) of conforming the portion of the high-resolution graphic image to the display area of the display device is performed at the network server prior to downloading to the client.

3. The method according to claim 2, wherein the display area is dictated by the network server.

4. The method according to claim 2, wherein the display area is included as part of the size data uploaded to the network server by the client.

5. The method according to claim 1, wherein step (d) of conforming the portion of the high-resolution graphic image to the display area of the display device is performed at the client upon receiving the downloaded high-resolution graphic image.

6. The method according to claim 1, further comprising prior to step (b):
   (e) extracting and zooming said portion from the low-resolution graphic image file at the client so as to produce a pseudo-zoomed, low-resolution image, and
   (f) displaying the pseudo-zoomed, low-resolution image at the client prior to displaying said portion of the high-resolution graphic image file downloaded to the client by the network server.

7. The method according to claim 1, wherein step (b) comprises the steps of:
   (i) arbitrarily selecting said portion of the low-resolution graphic image file using a pointing device,
   (ii) calculating the size data defining said portion, and
   (iii) uploading the size data to the network server.

8. The method according to claim 1, wherein the portion selected has a different aspect ratio to that of the display device, and there are further included the steps of:
   (h) displaying an area of the high-resolution image containing the selected portion, said area having an aspect ratio equal to that of the display device so as to include a sub-portion of the reference image outside of the selected portion, and
   (i) displaying said sub-portion with a different display characteristic to that of the selected portion.

9. The method according to claim 8, wherein said sub-portion is displayed at a reduced brightness to that of the selected portion.

10. The method according to claim 1, wherein the portion selected is too small after zooming to fill the display, and there are further included the steps of:
    (j) displaying the selected portion after zooming leaving a peripheral sub-portion of the reference image surrounding the selected portion, and
    (k) displaying said sub-portion with a different display characteristic to that of the selected portion.

11. The method according to claim 10, wherein said sub-portion is displayed at a reduced brightness to that of the selected portion.

12. The method according to claim 1, wherein step (b) comprises the steps of:
    (i) downloading from the network server to the client at reduced resolution a plurality of graphic image files so as to store at the client a corresponding plurality of low-resolution graphic image files,
    (ii) displaying a corresponding plurality of low-resolution images at the client each corresponding to a respective one of the low-resolution graphic image files, and
    (iii) selecting one of said low-resolution images for further processing.

13. The method according to claim 1, further including the steps of:

(a1) compressing said at least part of the reduced resolution graphic image file prior to downloading to the client, and (a2) decompressing the reduced resolution graphic image downloaded to the client file prior to storing the low-resolution graphic image file.

14. The method according to claim 13, wherein the step of compressing is performed in accordance with a compression format commonly provided in network browsers, thereby obviating any need to download decompression software to the client.

15. The method according to claim 1, further including the step of:

(h) uploading to the server a user reset, and (i) aborting step (f) of extracting the selected portion of the high-resolution graphic image file from the network server and downloading to the client.

16. The method according to claim 6, further including the steps of:

(j) uploading to the network server a user reset, (k) aborting step (f) of extracting the selected portion of the high-resolution graphic image file from the network server and downloading to the client, (l) aborting step (h) of extracting and pseudo-zooming the selected portion of the low-resolution graphic image file from the client, and (m) re-displaying on the display device the low-resolution image displayed in step (a).

17. The method according to claim 1, wherein:

step (c) is carried out by a Java servlet on the network server, step (b) is carried out by a Java applet on the client, and processing instructions are downloaded to the Java applet on the client.

18. The method according to claim 1, wherein the display area of the display device is less than a total area of the display device, and there are further included the steps of:

(i) displaying in a remaining portion of the display device information independently of the image data in said display area.

19. A system for downloading graphic images on a network, the system comprising:

a network server having a network memory for storing at least one high-resolution graphic image file of a reference image and a low-resolution graphic image file corresponding thereto, a communication line for downloading said low-resolution graphic image file from the network server to a client connected to the network server via the communication line, a memory at the client for storing the low-resolution graphic image file, a display device coupled to the memory for displaying a low-resolution image at the client corresponding to the low-resolution graphic image file, a zoom control coupled to the memory for uniquely specifying a portion of the low-resolution image which is to be displayed at high-resolution, which portion is less than the total image displayed by said display device, a client processor coupled to the memory and responsively coupled to the zoom control for determining size data uniquely defining said portion and for uploading said size data via the communication line to the network server, a network processor responsive to the size data for extracting said portion of the high-resolution graphic image file from the network server and downloading via the communication line to the client for display in said display area of said display device, and an image processor for conforming the portion of the high-resolution graphic image to a display area of the display device.

20. The system according to claim 19, wherein the image processor is part of the network processor.

21. The system according to claim 20, wherein the network memory stores data indicative of the display area.

22. The system according to claim 20, wherein the client processor is programmed to determine area data indicative of the display area and to embed said area data within the size data uploaded to the network.

23. The system according to claim 19, wherein the image processor is part of the client processor.

24. The system according to claim 19, further including:

a reset control for accepting a user reset for conveying to the server via the communication line, and the network processor being responsive to the reset control for aborting extraction of the selected portion of the high-resolution graphic image file therefrom and downloading to the client.

25. The system according to claim 19, wherein the client processor is programmed for:

(h) extracting and zooming said portion from the low-resolution graphic image file at the client so as to produce a pseudo-zoomed, low-resolution image, and (i) displaying the pseudo-zoomed, low-resolution image at the client prior to displaying said portion of the high-resolution graphic image file downloaded to the client by the network server.

26. The system according to claim 25, further including:

a reset control coupled to the client processor for accepting a user reset for conveying to the network server via the communication line;

the network processor being responsive to the reset control for aborting extraction of the selected portion of the high-resolution graphic image file therefrom and downloading to the client, and the client processor being responsive to the reset control for aborting pseudo-zooming of the selected portion of the low-resolution graphic image file from the client, and for re-displaying on the display device the low-resolution image displayed.

27. The system according to claim 19, wherein the zoom control includes:

a pointing device for arbitrarily selecting said portion of the low-resolution graphic image file, said client processor being responsively coupled to the pointing device for calculating the size data defining said portion.

28. The system according to claim 27, wherein:

the selected portion has a different aspect ratio to that of the display device, the display device displays an area of the high-resolution image containing the selected portion, said area having an aspect ratio equal to that of the display device so as to include a sub-portion of the reference image outside of the selected portion, and the client processor is responsive to said sub-portion for changing a display characteristic thereof.

29. The system according to claim 28, wherein said display characteristic is pixel intensity.

30. The system according to claim 27, wherein:

the selected portion is too small after zooming to fill the display, the display device displays the selected portion after zooming leaving a peripheral sub-portion of the reference image surrounding the selected portion, and the client processor is responsive to said peripheral sub-portion for changing a display characteristic thereof.

31. The system according to claim 30, wherein said display characteristic is pixel intensity.

32. The system according to claim 19, wherein:

the network server includes a data compressor for compressing said at least part of the reduced resolution graphic image file in accordance with a predetermined compression format prior to downloading to the client, and the client includes a data decompressor operating in accordance with said predetermined compression format for decompressing the reduced resolution graphic image downloaded to the client file prior to storage thereof.

33. The system according to claim 19, wherein the data compression format is commonly provided in network browsers, thereby obviating any need to download decompression software to the client.

34. The system according to claim 19, wherein:

the network is the Internet, the server is an HTTP Web server having associated therewith an image processor and image database and running a Java servlet for handling communication therewith, and the client runs a Java applet.

35. The system according to claim 34, wherein:

the image processor runs a processing module written in native code and being linked to the Java servlet through a Java Native Interface (JNI) defined by the Java language.

36. The system according to claim 34, wherein:

the image processor runs a processing module written in Java so as to allow maximum portability across servers.

37. The system according to claim 19, wherein the display area of the display device is less than a total area of the display device, and the network processor includes a peripheral data processor for downloading information to a remaining portion of the display device independently of the image data in the display area.

38. The method according to claim 17, wherein step (c) is carried out by an image processor on the network server using a processing module written in native code and being linked to the Java servlet through a Java Native Interface (JNI) defined by the Java language.

39. A program storage device readable by machine, tangibly embodying a program of instructions executable by the machine to perform method steps for downloading graphic images from a network server which stores at least one high-resolution graphic image file of a reference image and a corresponding low-resolution graphic image file, the method comprising:

(a) downloading at least part of said low-resolution graphic image file from the network server client connected to the network server for displaying a corresponding low-resolution image on a display device at the client, (a) uploading from the client to the network server size data uniquely specifying a portion of the image displayed in (a), which portion is less than the entire image displayed on said display device, (b) extracting said portion of the high-resolution graphic image file from the network server and downloading to the client, and (a) conforming said portion of the high-resolution graphic image to a display area of the display device for display in said display area thereof.

40. A computer program product comprising a computer useable medium having computer readable program code embodied therein for downloading graphic images from a network server which stores at least one high-resolution graphic image file of a reference image and a corresponding low-resolution graphic image file, the computer program product comprising:

computer-readable program code for causing the computer to download at least part of said low-resolution graphic image file from the network server to a client connected to the network server for displaying a corresponding low-resolution image on a display device at the client, computer-readable program code for causing the computer to upload from the client to the network server size data uniquely specifying a portion of the image displayed in (a), which portion is less than the entire image displayed on said display device, computer-readable program code for causing the computer to extract said portion of the high-resolution graphic image file from the network server and downloading to the client, and computer-readable program code for causing the computer to conform said portion of the high-resolution graphic image to a display area of the display device for display in said display area thereof.

* * * * *

UNITED STATES PATENT AND TRADEMARK OFFICE
CERTIFICATE OF CORRECTION

PATENT NO.     : 6,281,874 B1
DATED          : August 28, 2001
INVENTOR(S)    : Zohar Sivan, Hagia Krupnik and Benjamin Cohen It is certified that error appears in the above-identified patent and that said Letters Patent is hereby corrected as shown below:

<u>Column 14,</u>
Line 15, delete "(a)" and insert therefor -- (b) --.
Line 19, delete "(b)" and insert therefor -- (c) --.
Line 22, delete "(a)" and insert therefor -- (d) --.
Line 41, delete "in (a)" and insert therefor -- on the display device --.

Signed and Sealed this

Sixteenth Day of April, 2002

Attest:

JAMES E. ROGAN
*Attesting Officer*    *Director of the United States Patent and Trademark Office*